United States Patent
Kamal et al.

(10) Patent No.: US 11,158,026 B1
(45) Date of Patent: Oct. 26, 2021

(54) FIELD OF VIEW EXTENSION IN A STEREO CAMERA SYSTEM

(71) Applicant: Apple Inc., Cupertino, CA (US)

(72) Inventors: Ahmed Tashrif Kamal, San Jose, CA (US); Florian Ciurea, San Jose, CA (US); Jianping Zhou, Fremont, CA (US); Paul Hubel, Mountain View, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/825,550

(22) Filed: Mar. 20, 2020

Related U.S. Application Data

(60) Provisional application No. 62/821,704, filed on Mar. 21, 2019.

(51) Int. Cl.
*G06T 3/40* (2006.01)
*G06T 5/00* (2006.01)
*H04N 13/239* (2018.01)
*G06T 3/00* (2006.01)

(52) U.S. Cl.
CPC .......... *G06T 3/4038* (2013.01); *G06T 3/0093* (2013.01); *G06T 5/006* (2013.01); *H04N 13/239* (2018.05)

(58) Field of Classification Search
CPC ..... G06T 3/4038; G06T 3/0093; G06T 5/006; H04N 13/239
See application file for complete search history.

(56) References Cited

U.S. PATENT DOCUMENTS

| | | |
|---|---|---|
| 2017/0085764 A1 | 3/2017 | Kim |
| 2017/0201663 A1 | 7/2017 | Lee |
| 2018/0033155 A1* | 2/2018 | Jia ...................... H04N 5/23235 |
| 2018/0139382 A1 | 5/2018 | Venkataraman |
| 2018/0197321 A1* | 7/2018 | Pettersson ............ G06K 9/6215 |
| 2019/0058811 A1* | 2/2019 | Douady-Pleven .... G06T 3/0093 |
| 2019/0082103 A1* | 3/2019 | Banerjee ............... G06T 3/4038 |

* cited by examiner

*Primary Examiner* — Farzana Hossain
(74) *Attorney, Agent, or Firm* — Blank Rome LLP

(57) ABSTRACT

Electronic devices, computer readable storage media, and related methods are disclosed herein that are configured to stitch together images captured by multiple image capture devices of an image capture system. In particular, various techniques are employed to intelligently extend (and, optionally, smooth) the correspondence mapping between first and second images captured by image capture devices having different fields of view, e.g., fields of view that are at least partially overlapping and at least partially non-overlapping. The techniques may also include determining a "transitional" correspondence in a transitional region between the overlapping and non-overlapping regions of the fields of view, as well as performing one or more appearance correction operations to account for the different properties of the different image capture devices used to capture the first and second images. The techniques described herein may be employed to produce enhanced output images in either the still image or the video context.

20 Claims, 8 Drawing Sheets

FIRST IMAGE HAVING FIRST FOV

SECOND IMAGE HAVING SECOND FOV

CORRESPONDENCE MAP BETWEEN FIRST AND SECOND IMAGES

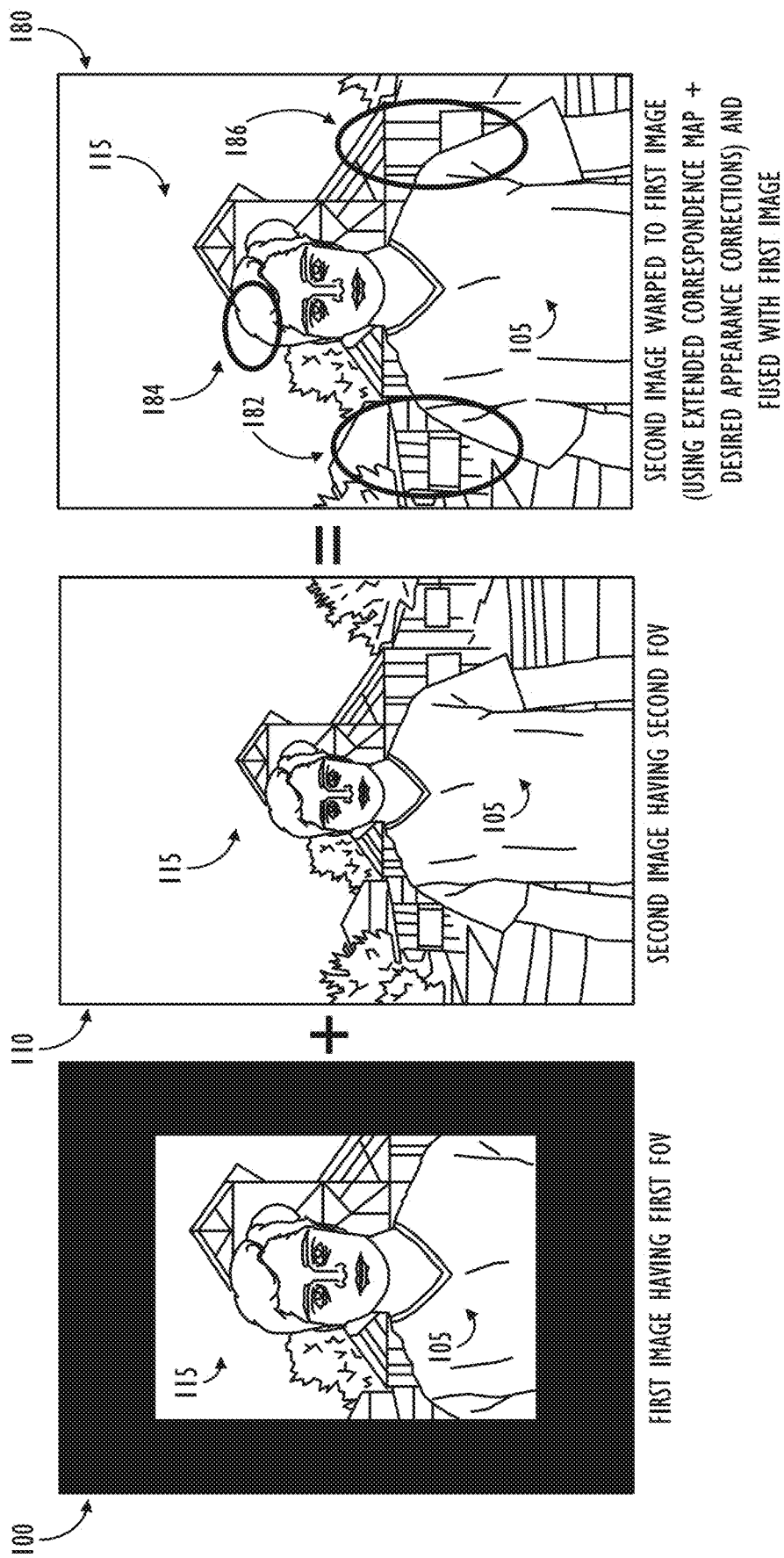

FIELD OF VIEW EXTENSION IN A STEREO CAMERA SYSTEM

TECHNICAL FIELD

This disclosure relates generally to the field of digital imaging. More particularly, but not by way of limitation, it relates to techniques for generating enhanced stitched images having an extended field of view.

BACKGROUND

The advent of mobile, multifunction devices, such as smartphones and tablet devices, has resulted in a desire for small form factor cameras capable of generating high levels of image quality in near-real time for integration into such mobile, multifunction devices. Increasingly, as users rely on these multifunction devices as their primary cameras for day-to-day use, users demand features and image quality levels that they have become accustomed to from the use of dedicated-purpose camera devices.

Some camera devices may comprise two or more image capture devices, e.g., in order to produce images having increased quality, field of view, depth information, etc., i.e., over what a camera device having a single image capture device may be able to produce. For example, stereo image capture systems may consist of two or more image capture devices pointed at the same scene, but that capture the scene from different viewpoints or with cameras that have different properties. In such a system, each image capture device may be chosen to have specific intrinsic properties, e.g., focal length, resolution, color sensitivity, etc., as well as specific extrinsic properties, such as orientation and position. In particular, by choosing complimentary intrinsic and extrinsic properties for the multiple image capture devices in a given image capture system, it may be possible to produce images of increased quality by intelligently combining the information captured by each image capture device.

In some such stereo image capture systems, the information from the various images captured by the two or more image capture devices may be combined, e.g., via a process known as "image stitching" or "photo stitching." By stitching together the images captured by the different image capture devices in a multi-camera image capture system, enhanced images may be generated that inherit the individual strengths of the various image capture devices in the image capture system, e.g., certain image capture devices may have a larger field of view (FOV), while other image capture devices may have better imaging quality at certain portions of the captured scene, etc. Stereo image stitching has applications in many areas, including image/video composition and video stabilization, which can utilize the increased FOV that is achievable from performing stereo image stitching. As used herein, stitching may refer to a process that extends the FOV of one or more of the individual source images or a process that generates a stitched image with the same FOV as one or more of the source images.

However, the image stitching process can be quite challenging, particularly due to the phenomenon of parallax, i.e., the apparent change in position of an object when viewed from different camera viewpoints. E.g., objects closer to the image capture system exhibit more parallax (i.e., greater displacement relative to the position of the object as viewed from the other viewpoint) than those objects that are farther away from the image capture system. Because of this property, parallax may be used as a proxy for depth estimates of objects in the scene, but parallax also causes other issues with image stitching, such as occlusion. Occlusion occurs where an object is visible from the viewpoint of one camera in the image capture system, but is not visible (e.g., due to being blocked by some other object) from the viewpoint of another camera in the image capture system. In cases of occlusion, for a given pixel from an image captured from a first viewpoint, there may be no "corresponding" pixel in an image taken from another viewpoint, and, thus, no other pixel's information with which to combine or enhance the given pixel's information.

Additionally, as mentioned above, different cameras within an image capture system can have different intrinsic properties, e.g., different fields of view, depth of field, spatial resolution and/or color sensitivity, which can further complicate the process of stitching together images from such disparate cameras without the appearance of noticeable artifacts or seams caused by the cameras' differing properties.

SUMMARY

Electronic devices, computer readable storage media, and related methods are disclosed herein that are configured to stitch together images captured by multiple image capture devices of an image capture system. In particular, various techniques are employed to intelligently extend (and, optionally, smooth) the correspondence mapping between first and second images captured by image capture devices having different fields of view (e.g., a first image having a smaller field of view than the second image, but which is at least partially overlapping with the second image's field of view), before warping the second image according to the correspondence mapping, and fusing at least a portion of the warped second image with the first image, to generate an output image having a field of view larger than the first image's field of view.

Throughout the discussion herein, the term "correspondence" will be used as a general term to refer to the relationship between corresponding (or "matching") pixels in images captured by image capture devices having varying viewpoints. The set of correspondence values for the pixels making up a given image may be stored in a "correspondence map." For example, if the image capture devices within an image capture system are calibrated, the correspondence map may comprise a simple one-dimensional "shift map," wherein the shift values in the shift map indicate how far (i.e., along an epipolar direction that is known or determinable, based on the cameras' respective position and calibration information) a pixel in one captured image would need to be shifted to align with its corresponding pixel in another captured image. In less controlled image capture systems, however, calibration and/or position information between the image capture devices may not always be known or accounted for, so generating the correspondence map may comprise solving a two-dimensional "optical flow map," wherein the values in the optical flow map comprise the direction and magnitude of the shift that would need to be applied to a given pixel in one captured image to align with its corresponding pixel in another captured image. Thus, determining the correspondence between pixels from images of differing viewpoints of a captured scene may be conceptualized as an image registration or pixel matching operation.

Another term that may be used herein to refer to the amount of shift between corresponding pixels in images captured from different viewpoints is "disparity." The disparity at which pixels making up an object in one image best match their corresponding pixels in another image captured from a different viewpoint may be used to estimate the depth of the object in the scene, i.e., the actual distance that the object is away from the capturing camera(s). Disparity information may be converted into depth information according to any desired method. For example, in some cases, depth is calculated as being generally proportional to the inverse of the disparity estimate.

Thus, according to some embodiments, electronic devices are disclosed that comprise: a first image capture device having a first field of view; a second image capture device having a second field of view, wherein the second field of view comprises a first region overlapping the first field of view and a second region not overlapping the first field of view; one or more processors; and a memory coupled to the one or more processors, wherein instructions are stored in the memory that, when executed, cause the one or more processors to: obtain a first image of a scene from the first image capture device; obtain a second image of the scene from the second image capture device, wherein the second image comprises: an overlap region corresponding to the first region of the second field of view; and a non-overlap region corresponding to the second region of the second field of view; generate a correspondence map, the correspondence map comprising: an inner region corresponding to a first portion of the first image and a corresponding portion of the overlap region of the second image, and an outer region corresponding to the non-overlap region of the second image; warp the second image using the correspondence map to create a warped image; and fuse a portion of the warped image and the first image to generate an output image, the output image corresponding to a field of view larger than the first field of view.

According to some embodiments, the instructions may further cause the one or more processors to smooth the correspondence map prior to using it to warp the second image. According to other embodiments, the instructions may further cause the one or more processors to determine a "transitional" correspondence in a transitional region between the overlapping and non-overlapping regions of the second field of view, wherein the correspondence map values in the transitional region comprise a blending between the determined correspondence values in the overlapping region of the correspondence map and determined smoothed correspondence values in the transitional region between the overlapping region and the non-overlapping region. According to still other embodiments, the instructions may further cause the one or more processors to perform one or more appearance correction operations on the warped image to account for various differing properties of the first and second image capture devices prior to fusing it with the first image. According to yet other embodiments, the instructions to fuse the warped image and the first image may further cause the one or more processors to fuse the warped image and the first image according to an alpha map. According to still further embodiments, the instructions to fuse the warped image and the first image may be based, at least in part, on a degree of similarity between the depth of field of the first image capture device and the second image capture device in a given portion of the overlapping region.

The techniques described herein may be applied to produce enhanced output images in either the still image or the video context. According to some embodiments, when applied in the video context, one or more temporal consistency constraints may be determined, e.g., to constrain the amount of variation that is permitted between consecutive images in the video file with respect to one or more properties, such as amount of color correction, amount of depth of field difference, correspondence map extension parameters, etc.

Various methods of stitching together images captured by multiple image capture devices of an image capture system having different fields of view are also disclosed herein, in accordance with the various electronic device embodiments enumerated above.

Various non-transitory program storage devices are also disclosed herein, the program storage devices comprising instructions stored thereon to cause one or more processors to perform operations in accordance with the various electronic device and method embodiments enumerated above.

BRIEF DESCRIPTION OF THE DRAWINGS

FIG. 1E shows an example of generating an extended FOV output image using first and second images having different fields of view, according to one or more embodiments.

DETAILED DESCRIPTION

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As mentioned above, techniques are described herein for stitching together images captured by multiple image capture devices of an image capture system. In particular, various techniques may be employed to intelligently extend (and, optionally, smooth) the correspondence map between first and second images captured by image capture devices having different fields of view, e.g., fields of view that are at least partially overlapping and at least partially non-overlapping, such that an output image may be generated that extends the field of view of the image of the first and second images that has the smaller field of view.

Figure 1A:
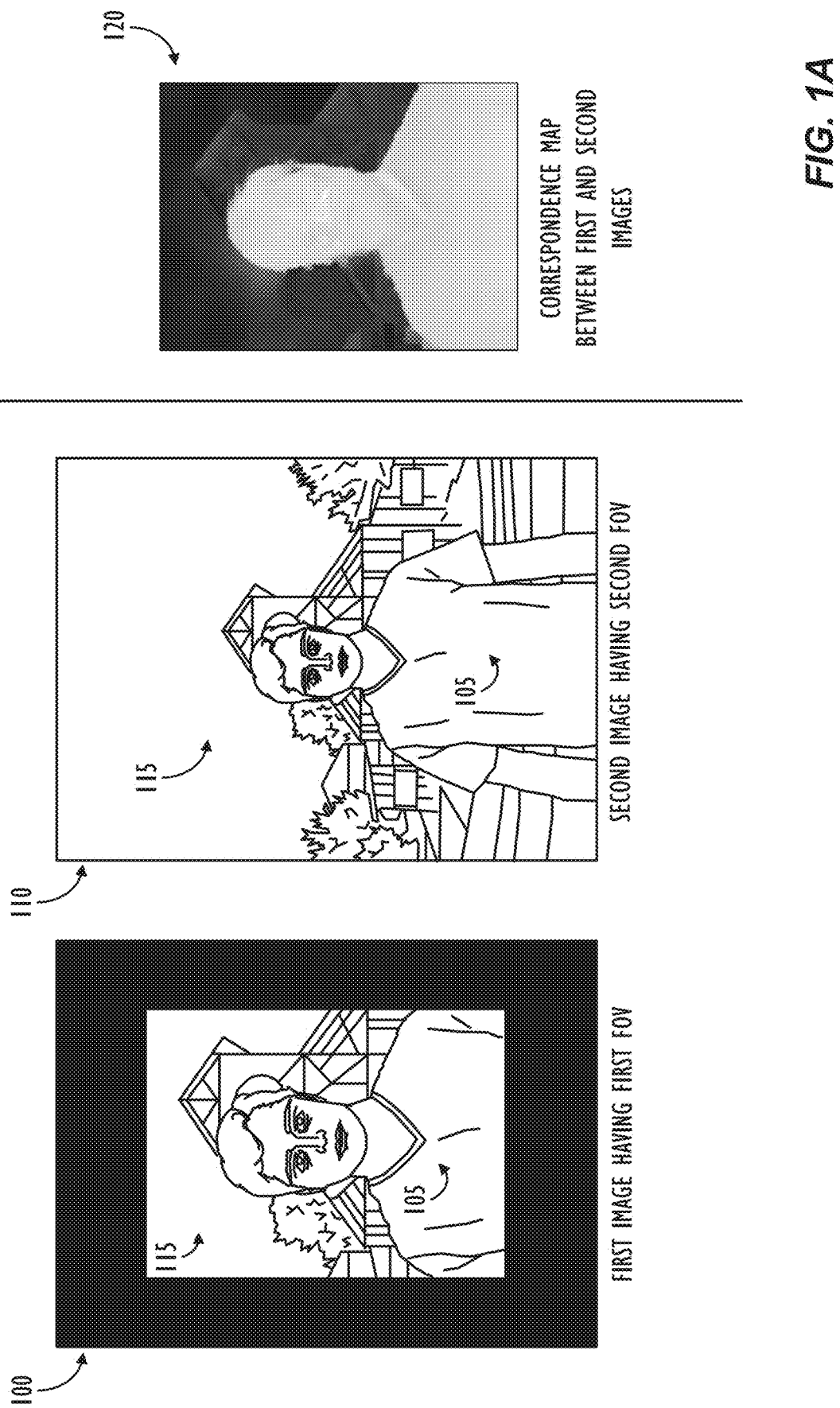
FIG. 1A is an example of a correspondence map between a first image having a first field of view and a second image having a second field of view.

Turning now to FIG. 1A, an example of a first image 100 having a first field of view and a second image 110 having a second field of view are shown. As illustrated in the example shown in FIG. 1A, the second field of view of the second image 110 is larger than the first field of view of the first image 100. For example, the second image 110 shows more of human subject 105's body and more of the surrounding scene 115. (Note: the black border regions around the perimeter of image 100 are simply meant to reflect unobserved areas of the scene, i.e., wherein there is no captured pixel data, and to illustrate the extent of the difference in field of view between the first image 100 and the second image 110.) According to some embodiments, the tradeoffs for the second image 110's larger field of view may be that the second image 110 has less spatial resolution than the first image 100 in certain portions of the scene, or poorer color reproduction than the first image 110, etc.

The correspondence map 120 illustrates a set of values corresponding to the pixels in the first image 100. (It should be noted that, in other embodiments, the correspondence map 120 may be constructed with reference to pixels in the second image 110, rather than the first image 100.) Correspondence map 120 may be determined using the various image capture devices' geometric calibration information and/or any desired stereo matching algorithm. Brighter pixels in the correspondence map 120 represent a larger disparity or shift between the corresponding pixels in the first image 100 and the second image 110 (and thus objects likely to be at a shorter distance), while darker pixels in the correspondence map 120 represent a smaller disparity or shift between the corresponding pixels in the first image 100 and the second image 110 (and thus objects likely to be at a greater distance). As illustrated in FIG. 1A, the correspondence map 120 does not show any values for the pixels in the non-overlapping region between first image 100 and second image 110, e.g., the arms of human subject 105 and the various trees in the periphery of the surrounding scene 115 in second image 110. As may be understood, this is because there are no corresponding pixels in the first image 100, whose smaller first field of view has not captured those portions of the surrounding scene. Thus, using traditional image fusion approaches, a fused image resulting from the fusion of the first image and the second image would have the same field of view/extent as the smaller first image, since the extent of the first image would be the only place that there was correspondence map information guiding the fusion system as to which pixels from the second image should be warped (and potentially fused) to which pixels of the first image. While using a correspondence map co-extensive with the constituent image have the smaller field of view (i.e., image 100, in this example) may produce improved results over an output image that is produced exclusively from the first image and first image capture device, it does not leverage the additional information available from the larger second field of view of the second image in an intelligent fashion, so as to increase the field of view of the first image, while still maintaining a high level of image quality, color reproduction, spatial resolution, etc.

Figure 1B:
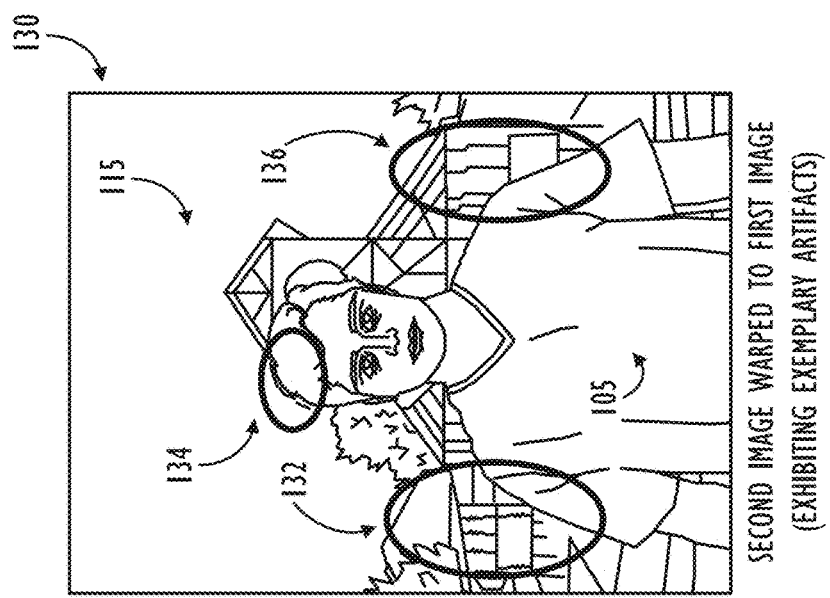
FIG. 1B is an example image including various artifacts caused by warping the second image from FIG. 1A to the first image from FIG. 1A using the correspondence map determined in FIG. 1A.
Figure 1B:
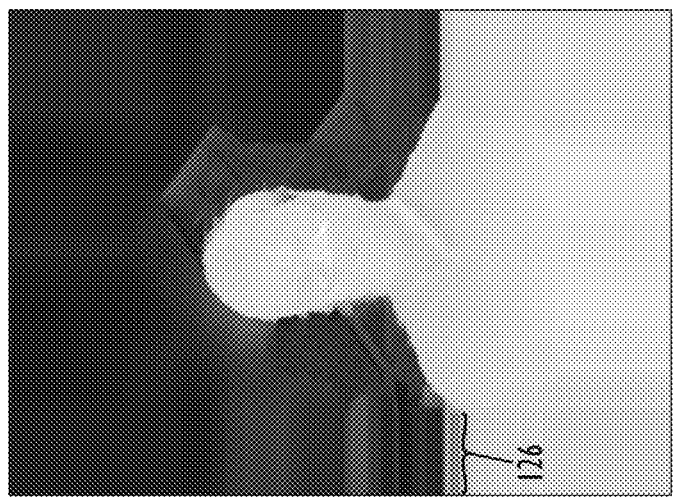
Figure 1B:
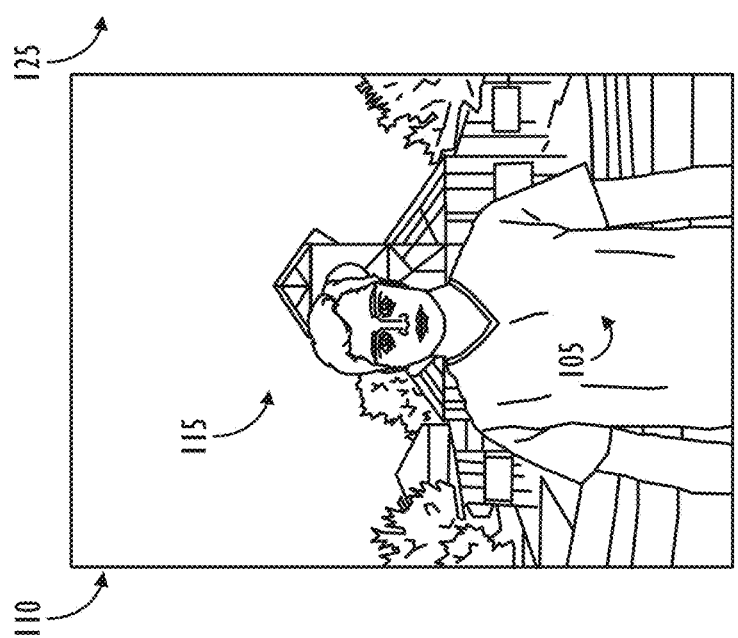

Turning now to FIG. 1B, an example image 130 including various artifacts (132/134/136) caused by warping the second image 110 to the first image 100 using an extended correspondence map 125 is shown. Extended correspondence map 125 represents a version of correspondence map 120 shown in FIG. 1A, but with the border pixel values replicated out to the extent of the correspondence map, i.e., in those areas that were not observed in the first image 100's smaller field of view. An example of the replicated pixel values for a given row in correspondence map 125 are shown as element 126 in FIG. 1B. Extended correspondence maps will be discussed in further detail with reference to FIG. 1C, below. As mentioned above, second image 110 has a larger field of view than first image 100. Thus, if performing a traditional warping operation from the second image 110 to the first image 100 (i.e., with the first image 100 serving as the referential image), there would potentially be various artifacts in the warped image, such as color matching errors, wobbly edges (134), seam mismatches (132/136), etc. If the smaller field of view first image 100 were thus later to be fused with an image such as example image 130, various of the artifacts, such as artifacts not contained in the smaller field of view of the first image 100 (e.g., exemplary artifacts 132/136) might continue to be visible in the output fused image having the larger field of view, since the first image 100 would not have any image data in those regions with which to attempt to ameliorate (or replace) the warping artifacts.

Figure 1C:
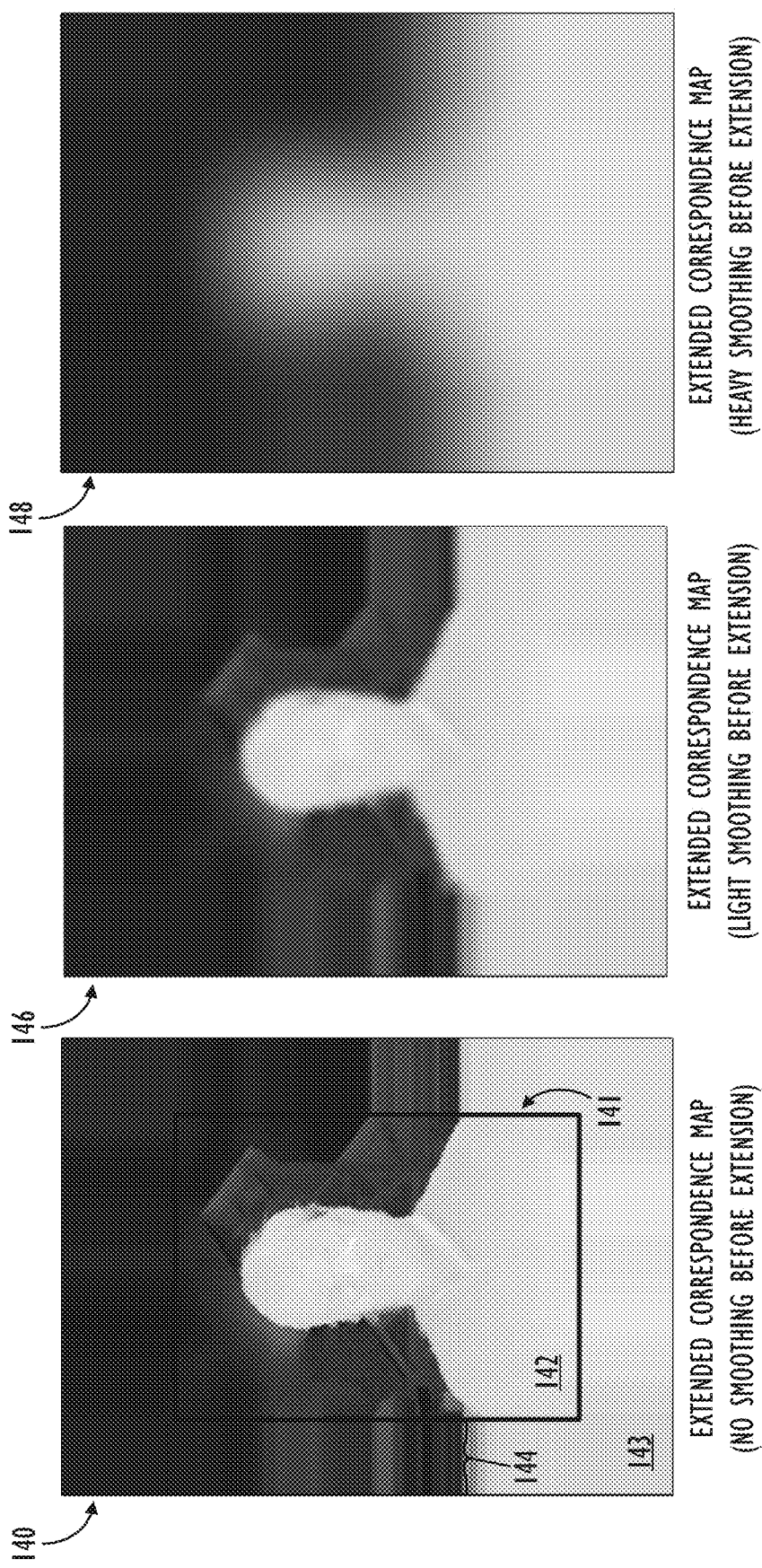
FIG. 1C shows examples of extended correspondence maps with varying degrees of smoothing, according to one or more embodiments.

Turning now to FIG. 1C, examples of extended correspondence maps (140/146/148) with varying degrees of smoothing are shown, according to one or more embodiments. As mentioned above, the values in the correspondence map represent the relative amounts of shift necessary to match a respective pixel in the second image to a corresponding pixel in the first image. In instances when the first and second images have different fields of view, e.g., an overlapping region and a non-overlapping region, there will be no matching pixels in the non-overlapping region of the two fields of view, and thus no "true" information in the correspondence map in such non-overlapping regions.

For example, as illustrated in correspondence map 140, the box 141 represents the extent of the field of view of the smaller FOV image (i.e., in this case, the first image 100). Thus, the inner region (i.e., inside box 141) corresponds to the overlapping region 142 of the first and second fields of view, and the outer region (i.e., outside box 141) corresponds to the non-overlapping region 143 of the first and second fields of view. As may now be appreciated more fully, there is no "true" correspondence information in non-overlapping region 143, because the first image 100 has no image data in this region. Thus, one approach to extending the correspondence map into the non-overlapping region 143 is to determine values based, at least in part, on the outermost value along each outer edge of the overlapping region 142 to the extent of the non-overlapping region 143, as is shown by the pixels in the partial row 144. In some embodiments, e.g., when a 'copying out' approach is applied to extend the correspondence map (i.e., copying out the outermost value along each outer edge to the extent of the non-overlapping region), it may result in the banded look to the correspondence map extension region shown in correspondence map 140. However, while extending the correspondence map based on the outermost value from the overlapping region 142 provides a rough estimate for the missing correspondence information, using this technique can also lead to several of the unwanted artifacts discussed above with reference to FIG. 1B, e.g., wobbly lines 132/136.

Thus, according to some embodiments, a degree of smoothing may be applied to the correspondence map, e.g., before it is extended into the non-overlapping region of the fields of view. For example, as shown in correspondence map 146, a light amount of smoothing has been applied to the correspondence map values in the overlapping region before extension into the non-overlapping region. The smoothing operation may help the correspondence map extension process be more robust to high frequency correspondence/disparity changes at the boundary between the overlapping and non-overlapping regions of the correspondence map, thereby potentially resulting in fewer artifacts in the resultant output image, e.g., the aforementioned wobbly lines.

According to other embodiments, for example, as shown in correspondence map 148, a heavy amount of smoothing has been applied to the correspondence map values in the overlapping region before extension into the non-overlapping region. While additional smoothing may be helpful to image quality to an extent, over-smoothing the correspondence map may result in other undesirable artifacts, such as seam mismatch between the overlapping region and the non-overlapping region of the output image, which may result in the appearance of "double" borders and/or a ghosting or halo effect around the edges of objects located near the border between the overlapping region and the non-overlapping region of the output image. Different image features can be distorted in different ways without making the distortion more noticeable than is tolerable in a given implementation. This notion of "distortion noticeability" can also be factored into the smoothing operation. Thus, in a given embodiment, there is likely to be an optimal level of smoothing that is dependent, e.g., on the inaccuracies and uncertainty in the correspondence map, which factors may be estimated during the generation of the correspondence map. It is noted that, in other embodiments, e.g., depending on the nature and quality of the correspondence map, the smoothing could also be done after the extension of the correspondence map into the non-overlapping region of the fields of view, rather than before the extension.

Therefore, according to some embodiments, as will be explained in greater detail with reference to FIG. 1D below, the determined values in the overlapping region of the correspondence map may be intelligently modified as they approach the non-overlapping region, e.g., using a "transitional" correspondence that intelligently combines the actual determined correspondence between the first and second images and a smoothed version of the determined correspondence between the first and second images in a transitional region between the overlapping and non-overlapping regions of the images, gradually moving towards using purely the image data from the image having the larger field of view as the pixels move farther and farther away from the overlapping region.

Figure 1D:
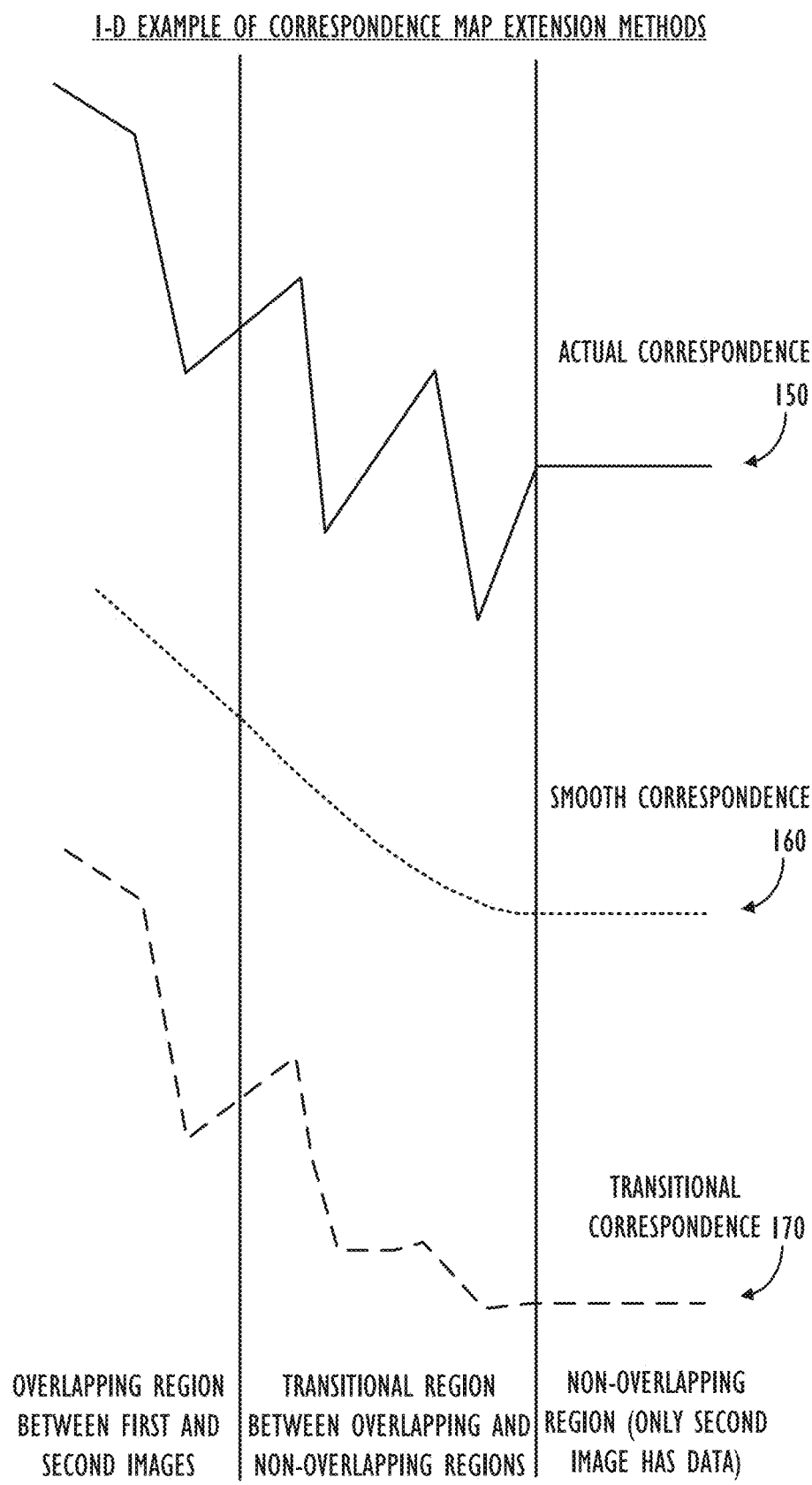
FIG. 1D shows various examples of one-dimensional correspondence map extension methods, according to one or more embodiments.

Turning now to FIG. 1D, various examples of one-dimensional correspondence map extension methods (150/160/170) are shown, according to one or more embodiments. As illustrated in FIG. 1D, the simplified 'one-dimensional' correspondence are shown for illustrative purposes, and may be thought of as representing, e.g., a single row (or a single column) of pixels in an image.

The left-most portions of the graphs labeled 150/160/170 represent the overlapping region between the first and second images. As illustrated, both the actual correspondence graph 150 and the transitional correspondence graph 170 utilize the actual, i.e., determined, correspondence between the first and second images in this region, while the smooth correspondence graph 160 uses a smoothed version of the actual correspondence curve 150 (e.g., a "curve of best fit" for the actual correspondence).

Next, the central portions of the graphs labeled 150/160/170 represent a "transitional" region between the overlapping region between the first and second images and the non-overlapping region. In other words, the transitional region may be defined as a region that borders the inner region on at least a first side and that borders the outer region on at least a second side. For example, the transitional region may comprise the last "n" pixels in a row moving outwardly (e.g., from right to left across the image) from the overlapping region towards the non-overlapping region. In some embodiments, e.g., depending on the application and/or desired quality levels, the transitional region could be so large that inner region is effectively reduced to zero pixels, i.e., all pixels inside the outer region are treated as being part of a transitional region into the outer region. As illustrated, the actual correspondence graph 150 again uses the actual correspondence between the first and second images in this transitional region, and the smooth correspondence graph 160 uses the smoothed version of the actual correspondence curve 150. However, the transitional correspondence graph 170 utilizes a blending between the actual correspondence between the first and second images in this region (as shown in graph 150) and the smooth correspondence curve (as shown in graph 160) in this transitional region. More particularly, the transitional correspondence graph 170 may start out in the transitional region (i.e., the left-edge of the transitional region in the example of FIG. 1D) with values that more closely match the corresponding values of the actual correspondence graph 150, while gradually blending more and more with the corresponding values of the smooth correspondence graph 160 as it approaches the end of the transitional region (i.e., the right-edge of the transitional region in the example of FIG. 1D). According to some embodiments, the values of the transitional correspondence graph 170 in the transitional region may be determined via an alpha blending between the corresponding values of the actual correspondence graph 150 and the smooth correspondence graph 160, with the value of alpha transitioning towards greater and greater contribution from the smooth correspondence graph 160 as the pixels approach the non-overlapping region (i.e., the right-edge of the transitional region in the example of FIG. 1D).

Finally, the right-most portions of the graphs labeled 150/160/170 represent the non-overlapping region between the first and second images (e.g., where image data may only exist from the second image having the larger FOV). As illustrated, once the pixels have moved beyond the extent of the transitional region, the extended correspondence values for each of the actual correspondence graph 150, the smooth correspondence graph 160, and the transitional correspondence graph 170 may each utilize the actual image information provided by the image having the larger field of view (i.e., in this example, the image with the larger field of view is the only image that has actual image data in this region). In other embodiments, in the non-overlapping region, the smooth correspondence values of the smooth correspondence graph 160 might also be slowly changing, e.g., as determined by the smoothing and/or extending scheme employed in a given implementation. In one embodiment, e.g., the smoothing may be applied more heavily the farther and farther away a pixel is from the overlapping region.

As may now be understood, benefits of using the transitional approach to extending the correspondence map include: (1) the aforementioned wobbly line artifacts may be reduced because the correspondence values are, at least in part, extrapolated from the smoothed correspondence data (i.e., as opposed to being dominated by one pixel on the border of the overlapping region whose values is copied out all the way to the edge of the non-overlapping region, as shown in image 140); and (2) the seam boundary artifacts may be reduced because, in the transition zone, the "actual" correspondence is known so, when warping from the second image to the first image with the transitional correspondence (which does deviate from the actual correspondence to some degree), the images will not match, but the degree of mismatch will be known, and thus may be compensated for, e.g., by slightly perturbing the first image itself according to the determined transitional correspondence.

In other embodiments, machine learning (ML) or other forms of artificial intelligence (AI) may be employed to predict what the correspondence/disparity of a given pixel or set of pixels should be in the extended correspondence zone. For example, if a known object, such as a tree, is detected in the transition zone, then known heuristics regarding the likely depth/disparity of trees in similar captured scenes may be applied to the estimated correspondences to push them in a direction that is likely to match the true depth of the tree object scene. In certain embodiments leveraging predictive-based methods of extending correspondence maps, the correspondence map may be extended by using the larger field of view camera as the reference image (and the smaller field fo view camera as the non-reference image) and then doing a forward warp (i.e., warping the reference image onto the non-reference image).

In still other embodiments ML/AI may also be employed to determine (or suggest) what the extent of the FOV extension should be. For example, if a known object, such as a human, is detected in the transition zone, then known heuristics regarding the likely shape of humans may be applied to suggest an amount of FOV extension. For example, if a FOV has been extended sufficiently to cover the shoulder, arm, hands, and/or fingers of a human subject near the edge of the scene, then further extension of the scene (e.g., to simply include more background pixels) may not be semantically meaningful (or worth the additional processing resources to compute), so the image capture system could determine or suggest an extended FOV that only captured out to the extent of the semantically meaningful or interesting objects in the captured scene, such as to the fingertips of the human subject, but not any farther.

Turning now to FIG. 1E, an example of generating an extended FOV output image 180 using first and second images having different fields of view is shown, according to one or more embodiments. As illustrated, a transitional correspondence method (e.g., as shown and discussed above with reference to graph 170) has been used to extend the field of view of first image 100 using information from the larger field of view of second image 110. Due to the use of the aforementioned transitional correspondence method, the exemplary artifacts (132/134/146) shown in image 130 of FIG. 1B have been largely reduced or removed in regions (182/184/186), respectively, as shown in image 180 of FIG. 1E. As will be discussed in further detail below, one or more optional appearance correction operations and/or fusion modifications may also be utilized in the generation of the final output image 180, so as to maintain a consistent look and/or smooth transition between the image information in output image 180 coming from the first image (i.e., within the overlapping region) and the image information in output image 180 coming from the second image (i.e., largely from the non-overlapping region).

Exemplary Process Overview

Figure 2:
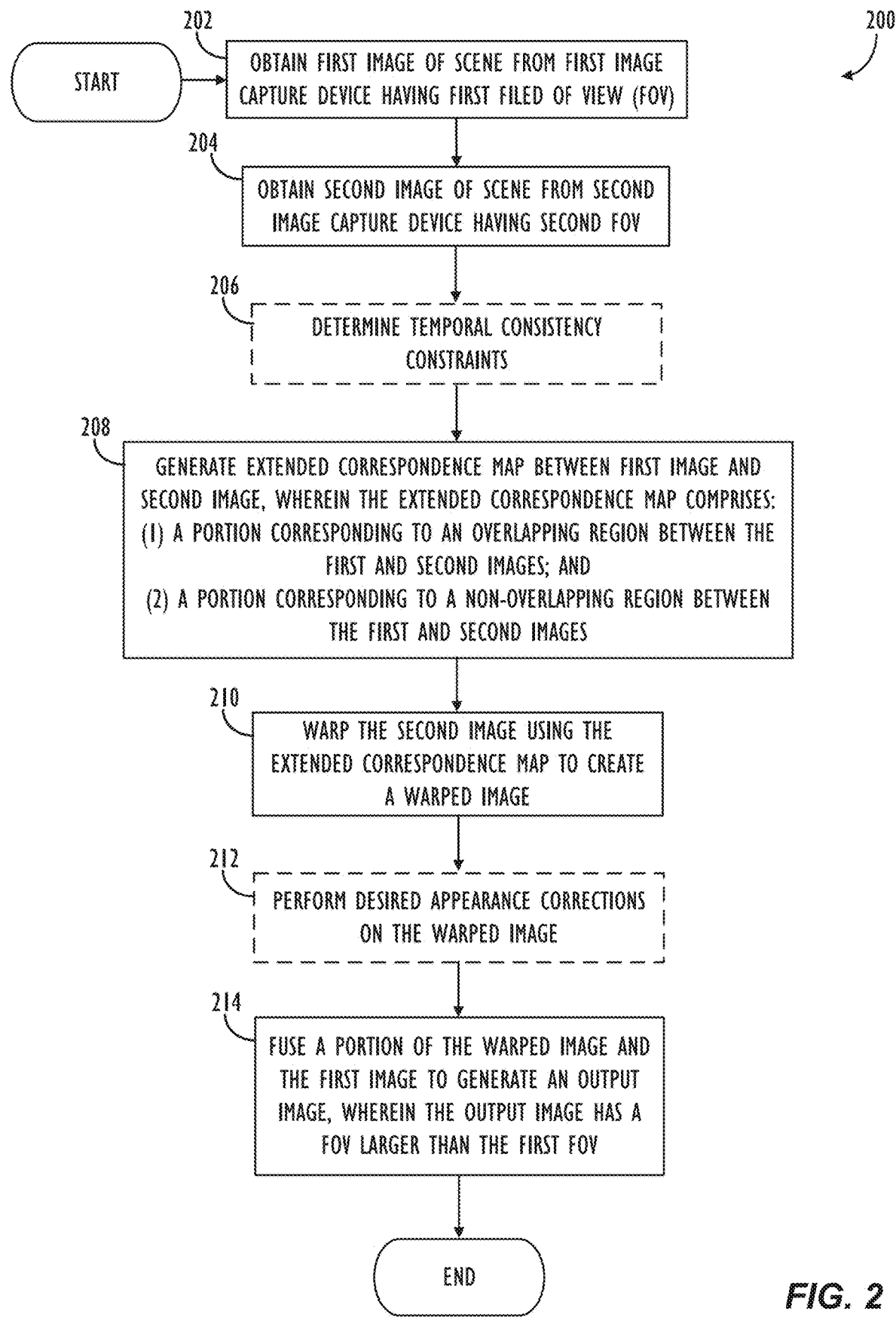
FIG. 2 is a flowchart showing an exemplary method for generating an extended FOV output image using first and second images having different fields of view, according to one or more embodiments.

Turning now to FIG. 2, an exemplary method 200 for generating an extended FOV output image using first and second images having different fields of view is shown in flowchart form, according to one or more embodiments described above. First, the method 200 may begin by obtaining a first image of a captured scene from a first image capture device having a first field of view (Step 202). Next, the method 200 may obtain a second image of the captured scene from a second image capture device having a second field of view (Step 204). As described above, in some embodiments, the first and second fields of view may be different in extent, e.g., with the second field of view being larger than the first field of view. In such instances, the second field of view may comprise a first region overlapping the first field of view and a second region not overlapping the first field of view. For example, if the first and second image capture devices are oriented in the same direction and offset slightly from one another, the first field of view may be wholly subsumed within the second field of view, as shown in the examples of FIG. 1A-1E. In some embodiments, the second field of view may be two (or more) times as large as the first field of view, e.g., a 70 degree diagonal field of view for the second field of view and a 35 degree diagonal field of view for the first field of view.

As mentioned above, the extended FOV techniques described herein may be equally applicable in either the still image or the video context. If being employed in the video context, it may be desirable to determine one or more temporal consistency constraints (Step 206) before proceeding with the remaining steps of method 200. (The dashed line box around Step 206 indicates that this step may be employed optionally, even in the video context.) The use of temporal consistency constraints may help to deal with the reduced time and/or processing resources associated with producing extended FOV images in a video capture context. Further, by constraining the amount that certain image properties (e.g., color matching properties) are allowed to vary on a frame-to-frame basis, the system may potentially reduce the amount of unwanted visual flickering in the assembled output video sequence. Thus, according to some embodiments, one or more state variables may be tracked from frame to frame, e.g., as to the different appearance correction parameters and/or correspondence map extension parameters, so that the amount of modification allowed in such parameters from frame to frame can be constrained, thereby potentially smoothing out or otherwise improving the look of the resulting video sequence (as well as potentially reducing the amount of processing resources required to generate the extended FOV image in the video context).

Once any desired temporal consistency constraints have been determined and obtained, the method 200 may proceed to Step 208, wherein an extended correspondence map may be generated between the first image and the second image. As explained above, a typical correspondence map may only have values corresponding to an overlapping region between the first and second images for which the correspondence map is being generated. However, according to some embodiments disclosed herein, the correspondence map may be extended, so as to comprise: (1) a portion corresponding to an overlapping region between the first and second images (e.g., an inner region); and (2) a portion corresponding to a non-overlapping region between the first and second images (e.g., an outer region).

As described above, e.g., with reference to FIG. 1C, a desired degree of smoothing may be applied to the correspondence map, wherein the smoothing helps the correspondence map extension process be more robust to high frequency correspondence changes at the boundary of the overlapping region and non-overlapping regions. As also described above, e.g., with reference to FIG. 1D, various approaches may be taken to determine a correspondence map having values in both the overlapping region and the non-overlapping region, including a transitional region at the outer edges of the overlapping region, wherein one or both images may be intentionally perturbed, such there is a smooth transition in parallax from the inner region to the outer region. According to some embodiments, the perturbation may be performed under one or more desired constraints, e.g., a constraint that specifies that the contents of the perturbed image(s) align in the transitional region.

Returning to method 200, at Step 210, the second image may be warped (e.g., referential to the first image) using the extended correspondence map to create a warped image. As described above, the optional correspondence map smoothing steps may help to reduce warping artifacts at depth boundaries in the scene.

Next, one or more desired appearance correction operations may be performed on the warped image (Step 212), e.g., so that it better matches with the visual characteristics of the first image before the two images are fused together to form the extended FOV output image. (The dashed line box around Step 212 indicates that this step may also be employed optionally.) As mentioned above, the different first and second image capture devices used to capture the first image and second image, respectively, may impart the first and second images with different: depth of field, spatial resolution, texture appearance, noise levels, exposure settings, lens flare regions, amounts of motion blurring, color profiles, etc. In some embodiments, one or more global appearance corrections may be applied to one or both of the first and second images to attempt to correct for differences in appearance between the first and second images. In other embodiments, one or more local appearance corrections (e.g., corrections that are applied selectively to less than an entire image) may be applied to one or both of the first and second images to attempt to correct for differences in appearance between particular portions of the first and second images. According to still other embodiments, one or more global appearance corrections and one or more local appearance corrections may be applied to one or both of the first and second images. As may be understood, in yet other embodiments, there may not be sufficient time, processing resources, and/or desire to apply any appearance correction operations (e.g., in the video context), thus the appearance correction operations may be selectively turned on or off, according to the needs of a given implementation.

Next, at Step 214, at least a portion of the warped image and the first image may be fused together to generate an output image, wherein the output image has a field of view larger than the first field of view. According to some embodiments, the fusion operation may take place according to an alpha map having values that specify the relative contributions of pixels from the first and second images to the fusion operation. For example, for pixels within the overlapping region (e.g., falling within the first field of view of the first image), the alpha map may specify 100% contribution from the first image for the pixels in the output image. Then, towards the boundary of the overlapping region and the non-overlapping region, the alpha map may specify a transition towards using a 100% contribution from the second image for the pixels in the output image. As may be understood, the degree of sharpness of the falloff from using pixels 100% from the first image to using pixels 100% from the warped (and, optionally, appearance-corrected) second image may be tuned for a given implementation (e.g., in terms of the number of pixels or percentage of pixels over which the transition occurs), such that the appearance of undesired seams or transitions between the first image and second image is minimized to a desired extent. After generating the fused output image, the method 200 may terminate, with respect to the present first and second images. As mentioned above, in the video context, the method 200 may be repeated multiple times, e.g., for as long as the image capture system continues to capture images and/or when a user indicates a desire to cease video capture.

Exemplary System Overview

Figure 3:
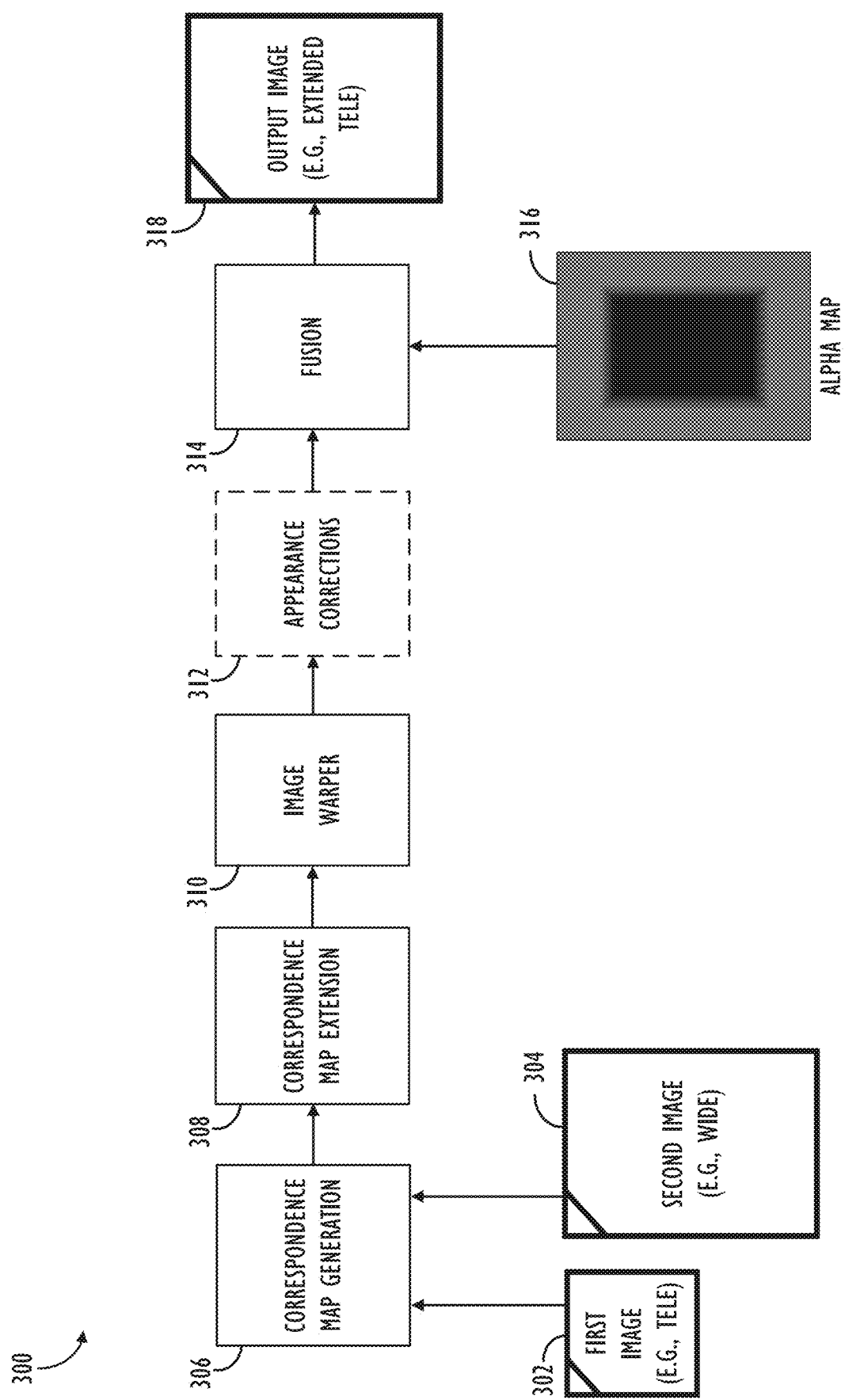
FIG. 3 is a block diagram of a system for generating extended FOV output images using first and second images having different fields of view, according to one or more embodiments.

Turning now to FIG. 3, a block diagram of a system 300 for generating extended FOV output images using first and second images having different fields of view is shown, according to one or more embodiments. Beginning at the left-hand side of FIG. 3, a first image 302 (e.g., a so-called 'tele' image) and a second image 304 (e.g., a so-called 'wide' image, having a FOV larger than the first image) may be obtained by the system 300, e.g., from different image capture devices having differing image capture properties. First image 302 and second image 304 are illustrated with differing sizes in FIG. 3 to reflect the differing fields of view of the images, but the illustration is not meant to imply any necessary relative sizes or fields of view between the first and second images.

Next, the aforementioned correspondence map generation process 306 may be executed as between the first and second images. As mentioned above, the particular type of correspondence map used in a given embodiment may be based on the needs of the given embodiment and/or what type of image capture mode the image capture device is operating in (e.g., still photo versus video capture). For example, the correspondence map may comprise a simple one-dimensional shift map, wherein the shift values in the map indicate how far a pixel in one captured image would need to be shifted to align with its corresponding/matching pixel in another captured image. In other embodiments, the correspondence map may comprise a two-dimensional optical flow map, wherein the values in the optical flow map comprise the direction and magnitude of the shift that would need to be applied to a given pixel in one captured image to align with its corresponding pixel in another captured image. The correspondence map may also be referred to as a flow map, a shift map, or a disparity map, as it generally attempts to capture the amount of disparity between corresponding pixels from differing viewpoints of the same captured scene.

Next, the correspondence map extension process 308 may be executed as between the first and second images. As illustrated, e.g., with respect to FIG. 1C, various techniques may be employed to extend the correspondence map into the regions where data is not observed in the image having the smaller field of view as between the first and second images. For example, the border values in the correspondence map generated by process (306), i.e., a correspondence map comprising an overlapping region between the first and second images, may smoothed to a desired degree. Then, the smoothed values may be extrapolated or copied out in each direction to the extent of the image having the larger field of view as between the first and second images, i.e., to the extent of the non-overlapping region between the first and second images. As illustrated, e.g., with respect to FIG. 1D, various additional techniques may further be employed to create a more seamless blending between the first and second images in a transitional region between the overlapping region and that non-overlapping region. For example, a transitional correspondence map extension method may be employed, which blends between the determined actual correspondence between the first and second images and the smoothed version of the correspondence map as pixels move closer and closer to the non-overlapping region, wherein the image data from the warped (and, optionally, appearance-corrected) second image may be used directly to fill out the pixel data in the non-overlapping regions of the extended FOV output image.

Next, at block 310, the extended correspondence map generated in process 308 may be used to warp the second image 304 to the first image 302's referential. Next, at block 312, one or more optional appearance correction operations may be applied to the warped second image, e.g., to account for differences in the image capturing properties of the first and second image capture devices and to prepare the warped second image for fusion with the first image. Next, at block 314, the fusion operation is conducted, which serves to stitch together the first image and the warped second image to create an output image (318) having an extended FOV, e.g., a FOV larger than that of the first image. As may be understood, the extended FOV of the output image (as compared to the first image) may be useful in various applications, e.g., to present images to a client application that have a different FOV or aspect ratio than the first image capture device is capable of producing on its own, to provide additional overscan region to an image or video stabilization process than would be available in images captured by the first image capture device alone, and/or to intelligently suggest extended FOVs to a user that capture some additional semantically meaningful or important scene object not captured in the first image's FOV, etc.

As mentioned above, the fusion operation of block 314 may be implemented according to an alpha map having values that specify the relative contributions of pixels from the first and second images to the fusion operation, one example of which is shown in alpha map 316 in FIG. 3. As illustrated by the black pixels in alpha map 316 in the inner region (i.e., overlapping region) of the first and second images, there is no contribution from the pixels of the warped second image to the output image in the inner region. Then, along the border between the overlapping and non-overlapping regions of alpha map 316, there is a transition to whiter pixels (i.e., indicating a greater contribution from the warped second image to the output image), until the alpha map specifies the contribution to the fused image coming fully from the warped second image in the non-overlapping region (i.e., in the outermost region of alpha map 316).

In other embodiments, more complex fusion schemes, e.g., employing one or more fusion modifications, may be utilized, if desired. For example, fusion schemes that attempt to utilize frequency matching techniques, so as to further reduce the appearance of any transition between the first and second images, may be used. In still other embodiments, for example, the fusion operation 314 may only fuse the first and second images in regions where their respective depths of field of the images are within a determined threshold difference of each other. In yet other embodiments, the correspondence map itself may be leveraged as a proxy for scene depth, such that the first and second images are only fused, e.g., where pixels in both the first and second images are within a certain depth range, such as where pixels in both the first and second images are within their respective image capture devices' depth of field/focus range, etc. If desired by a given implementation, it may also be possible to remove or mitigate the effects of lens flare mismatch and/or motion blurring difference (e.g., due to being captured with different integration times) between the first and second images using fusion operation 314 before generating the final output image 318.

Exemplary Electronic Device

Figure 4:
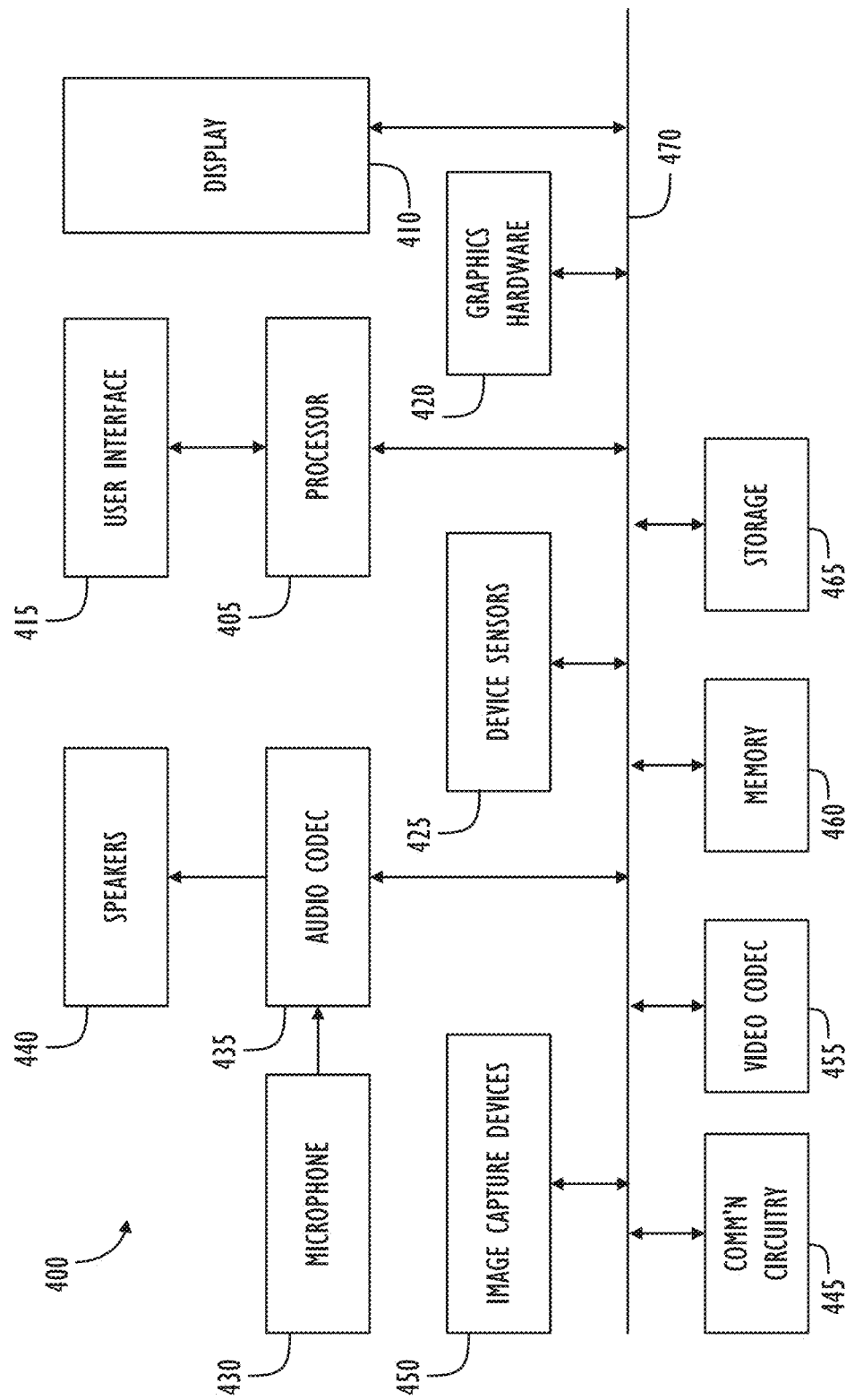
FIG. 4 is a block diagram illustrating an exemplary electronic device, in which one or more of the techniques disclosed herein may be implemented.

Referring now to FIG. 4, a simplified functional block diagram of illustrative programmable electronic device 400 is shown according to one embodiment. Electronic device 400 could be, for example, a mobile telephone, personal media device, portable camera, or a tablet, notebook or desktop computer system. As shown, electronic device 400 may include processor 405, display 410, user interface 415, graphics hardware 420, device sensors 425 (e.g., proximity sensor/ambient light sensor, accelerometer and/or gyroscope), microphone 430, audio codec(s) 435, speaker(s) 440, communications circuitry 445, image capture devices 450, which may, e.g., comprise multiple image capture devices, such as camera units/optical image sensors having different characteristics or abilities (e.g., High Dynamic Range (HDR), Optical Image Stabilization (OIS) systems, optical zoom, digital zoom, etc.) or characteristics (e.g., DOF, spatial resolution, color reproduction, etc.), video codec(s) 455, memory 460, storage 465, and communications bus 470.

Processor 405 may execute instructions necessary to carry out or control the operation of many functions performed by electronic device 400 (e.g., such as the generation and/or processing of image information in accordance with the various embodiments described herein). Processor 405 may, for instance, drive display 410 and receive user input from user interface 415. User interface 415 can take a variety of forms, such as a button, keypad, dial, a click wheel, keyboard, display screen and/or a touch screen. User interface 415 could, for example, be the conduit through which a user may view a captured video stream and/or indicate particular frame(s) that the user would like to capture (e.g., by clicking on a physical or virtual button at the moment the desired frame is being displayed on the device's display screen). In one embodiment, display 410 may display a video stream as it is captured while processor 405 and/or graphics hardware 420 and/or image capture circuitry contemporaneously generate and store the video stream in memory 460 and/or storage 465. Processor 405 may be a system-on-chip such as those found in mobile devices and include one or more dedicated graphics processing units (GPUs). Processor 405 may be based on reduced instruction-set computer (RISC) or complex instruction-set computer (CISC) architectures or any other suitable architecture and may include one or more processing cores. Graphics hardware 420 may be special purpose computational hardware for processing graphics and/or assisting processor 405 perform computational tasks. In one embodiment, graphics hardware 420 may include one or more programmable graphics processing units (GPUs).

Image capture devices 450 may comprise one or more camera units configured to capture images, e.g., images which may be processed to generate correspondence map information for such captured images, e.g., in accordance with this disclosure. In cases of electronic devices having multiple image capture device, the multiple image capture devices (e.g., ones pointing in the same direction or on the same side of the electronic device) may be configured to have differing fields of view, e.g., where image capture device has a field of view that is larger than another image capture device, and wherein the respective fields of view of such image capture devices may have overlapping regions and non-overlapping regions, as described in detail above.

Output from image capture devices 450 may be processed, at least in part, by video codec(s) 455 and/or processor 405 and/or graphics hardware 420, and/or a dedicated image processing unit or image signal processor incorporated within image capture devices 450. Images so captured may be stored in memory 460 and/or storage 465. Memory 460 may include one or more different types of media used by processor 405, graphics hardware 420, and image capture devices 450 to perform device functions. For example, memory 460 may include memory cache, read-only memory (ROM), and/or random access memory (RAM). Storage 465 may store media (e.g., audio, image and video files), computer program instructions or software, preference information, device profile information, and any other suitable data. Storage 465 may include one or more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 460 and storage 465 may be used to retain computer program instructions or code organized into one or more modules and written in any desired computer programming language. When executed by, for example, processor 405, such computer program code may implement one or more of the methods or processes described herein.

It is to be understood that the above description is intended to be illustrative, and not restrictive. For example, the use of semantic segmentation to inform depth algorithms and improve their quality as described in this disclosure can be used with multiple sensor modalities and is not dependent on the specific sensing or hardware involved. Applications include, but are not limited to, disparity computed from a traditional stereo image pair, disparity computed from focus pixels (i.e., pixels used for phase detection autofocus), and depth acquired via active sensing. Also, in this disclosure, both depth and disparity estimation are referred to. It is to be understood that, broadly speaking, disparity may be viewed as inversely proportional to depth.

Many other embodiments will be apparent to those of skill in the art upon reviewing the above description. The scope of the invention therefore should be determined with reference to the appended claims, along with the full scope of equivalents to which such claims are entitled.

What is claimed is:

1. An electronic device, comprising:
   a first image capture device having a first field of view;
   a second image capture device having a second field of view, wherein the second field of view wholly subsumes the first field of view, and wherein the second field of view comprises a first region overlapping the first field of view and a second region not overlapping the first field of view;
   one or more processors; and
   a memory coupled to the one or more processors, wherein instructions are stored in the memory, and wherein the instructions, when executed, cause the one or more processors to:
   obtain a first image of a scene from the first image capture device;
   obtain a second image of the scene from the second image capture device, wherein the second image comprises:
      an overlapping region corresponding to the first region of the second field of view; and
      a non-overlapping region corresponding to the second region of the second field of view;
   generate a correspondence map, the correspondence map comprising:
      an inner region corresponding to a first portion of the first image and a corresponding portion of the overlapping region of the second image, and
      an outer region corresponding to the non-overlapping region of the second image;
   warp the second image using the correspondence map to create a warped image; and
   fuse a portion of the warped image and the first image to generate an output image, the output image comprising a field of view larger than the first field of view.

2. The electronic device of claim 1, wherein the inner region of the correspondence map comprises determined correspondence values between corresponding pixels of the first image and the second image.

3. The electronic device of claim 1, wherein the outer region of the correspondence map comprises correspondence values based, at least in part, an outermost value along each outer edge of the inner region.

4. The electronic device of claim 1, wherein the instructions that, when executed, cause the one or more processors to generate a correspondence map further comprise instructions that, when executed, cause the one or more processors to generate a correspondence map further comprising:
   a transitional region corresponding to a second portion of the first image and a corresponding portion of the overlapping region of the second image, wherein the transitional region borders the inner region on at least a first side and borders the outer region on at least a second side.

5. The electronic device of claim 4, wherein the transitional region of the correspondence map comprises correspondence values computed by blending, for a respective pixel in the transitional region, between: (i) a determined correspondence value between the first image and the second image for the respective pixel; and (ii) a determined smoothed correspondence value between the first image and the second image for the respective pixel.

6. The electronic device of claim 1, wherein the instructions further comprise instructions that, when executed, cause the one or more processors to:
   smooth the inner region of the correspondence map.

7. The electronic device of claim 1, wherein the instructions further comprise instructions that, when executed, cause the one or more processors to:
   perform one or more appearance correction operations on the warped image.

8. The electronic device of claim 1, wherein the instructions that, when executed, cause the one or more processors to fuse a portion of the warped image and the first image to generate an output image further comprise instructions that, when executed, cause the one or more processors to:
   fuse the portion of the warped image and the first image according to an alpha map.

9. The electronic device of claim 1, wherein the instructions further comprise instructions that, when executed, cause the one or more processors to:
   determine one or more temporal consistency constraints, wherein the instructions to generate the correspondence map are further based, at least in part, on the determined one or more temporal consistency constraints.

10. The electronic device of claim 7, wherein the instructions further comprise instructions that, when executed, cause the one or more processors to:
  determine one or more temporal consistency constraints,
  wherein the instructions to generate the correspondence map and the instructions to perform one or more appearance correction operations on the warped image are further based, at least in part, on the determined one or more temporal consistency constraints.

11. A method, comprising:
  obtaining a first image of a scene from a first image capture device having a first field of view;
  obtaining a second image of the scene from a second image capture device having a second field of view, wherein the second field of view wholly subsumes the first field of view, wherein the second field of view comprises a first region overlapping the first field of view and a second region not overlapping the first field of view, and wherein the second image comprises:
    an overlapping region corresponding to the first region of the second field of view; and
    a non-overlapping region corresponding to the second region of the second field of view;
  generating a correspondence map, the correspondence map comprising:
    an inner region corresponding to a first portion of the first image and a corresponding portion of the overlapping region of the second image, and
    an outer region corresponding to the non-overlapping region of the second image;
  warping the second image using the correspondence map to create a warped image; and
  fusing a portion of the warped image and the first image to generate an output image, the output image comprising a field of view larger than the first field of view.

12. The method of claim 11, wherein the inner region of the correspondence map comprises determined correspondence values between corresponding pixels of the first image and the second image.

13. The method of claim 11, wherein the outer region of the correspondence map comprises correspondence values based, at least in part, an outermost value along each outer edge of the inner region.

14. The method of claim 11, wherein generating a correspondence map further comprises generating a correspondence map comprising:
  a transitional region corresponding to a second portion of the first image and a corresponding portion of the overlapping region of the second image, wherein the transitional region borders the inner region on at least a first side and borders the outer region on at least a second side.

15. The method of claim 14, wherein the transitional region of the correspondence map comprises correspondence values computed by blending, for a respective pixel in the transitional region, between: (i) a determined correspondence value between the first image and the second image for the respective pixel; and (ii) a determined smoothed correspondence value between the first image and the second image for the respective pixel.

16. A non-transitory program storage device comprising instructions stored thereon to cause one or more processors to:
  obtain a first image of a scene from a first image capture device having a first field of view;
  obtain a second image of the scene from a second image capture device having a second field of view, wherein the second field of view wholly subsumes the first field of view, wherein the second field of view comprises a first region overlapping the first field of view and a second region not overlapping the first field of view, and wherein the second image comprises:
    an overlapping region corresponding to the first region of the second field of view; and
    a non-overlapping region corresponding to the second region of the second field of view;
  generate a correspondence map, the correspondence map comprising:
    an inner region corresponding to a first portion of the first image and a corresponding portion of the overlapping region of the second image, and
    an outer region corresponding to the non-overlapping region of the second image;
  warp the second image using the correspondence map to create a warped image; and
  fuse a portion of the warped image and the first image to generate an output image, the output image comprising a field of view larger than the first field of view.

17. The non-transitory program storage device of claim 16, wherein the instructions further comprise instructions that, when executed, cause the one or more processors to:
  perform one or more appearance correction operations on the warped image.

18. The non-transitory program storage device of claim 16, wherein the instructions that, when executed, cause the one or more processors to fuse a portion of the warped image and the first image to generate an output image further comprise instructions that, when executed, cause the one or more processors to:
  fuse the portion of the warped image and the first image according to an alpha map.

19. The non-transitory program storage device of claim 16, wherein the instructions further comprise instructions that, when executed, cause the one or more processors to:
  determine one or more temporal consistency constraints,
  wherein the instructions to generate the correspondence map are further based, at least in part, on the determined one or more temporal consistency constraints.

20. The non-transitory program storage device of claim 17, wherein the instructions further comprise instructions that, when executed, cause the one or more processors to:
  determine one or more temporal consistency constraints,
  wherein the instructions to generate the correspondence map and the instructions to perform one or more appearance correction operations on the warped image are further based, at least in part, on the determined one or more temporal consistency constraints.

* * * * *